United States Patent
Fieau et al.

(10) Patent No.: US 11,665,133 B2
(45) Date of Patent: May 30, 2023

(54) METHOD FOR DETERMINING A DELEGATION CHAIN ASSOCIATED WITH A DOMAIN NAME RESOLUTION IN A COMMUNICATION NETWORK

(71) Applicant: ORANGE, Issy-les-Moulineaux (FR)

(72) Inventors: Frédéric Fieau, Chatillon (FR); Jesús Alberto Polo Garcia, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 18 days.

(21) Appl. No.: 17/415,241

(22) PCT Filed: Dec. 11, 2019

(86) PCT No.: PCT/FR2019/053028
§ 371 (c)(1),
(2) Date: Jun. 17, 2021

(87) PCT Pub. No.: WO2020/128239
PCT Pub. Date: Jun. 25, 2020

(65) Prior Publication Data
US 2022/0070136 A1     Mar. 3, 2022

(30) Foreign Application Priority Data
Dec. 19, 2018   (FR) ...................................... 1873372

(51) Int. Cl.
*H04L 61/4511*   (2022.01)
*H04L 67/563*   (2022.01)

(52) U.S. Cl.
CPC ........ *H04L 61/4511* (2022.05); *H04L 67/563* (2022.05)

(58) Field of Classification Search
None
See application file for complete search history.

(56) References Cited

U.S. PATENT DOCUMENTS 7,260,598 B1 * 8/2007 Liskov ................... H04L 67/63
                                                                    709/201
8,909,736 B1   12/2014 Bosch et al.
(Continued)

FOREIGN PATENT DOCUMENTS

WO     2018115647 A1    6/2018

OTHER PUBLICATIONS

Sheffer et al. "An ACME Profile for Generating Delegated STAR Certificates", ietf.org, Nov. 13, 2018 [retrieved on Dec. 14, 2021]. Retrieved from the Internet: <URL: https://tools.ietf.org/pdf/draft-sheffer-acme-star-delegation-01.pdf>. (Year: 2018).*

(Continued)

*Primary Examiner* — Kevin T Bates
*Assistant Examiner* — Dae Kim
(74) *Attorney, Agent, or Firm* — David D. Brush; Westman, Champlin & Koehler, P.A.

(57) ABSTRACT

A redirection device and method, relating to identification of a data server capable of delivering content to a terminal, initiated by the transfer to a second name server of a second domain of a message for obtaining an identifier of the data server in the second domain received from the terminal. Following this transfer, the second name server sends a redirection message to a first domain, including a delegation chain including first data for redirection from the second domain to the first domain. The chain is updated recursively with the redirections between domains added by respective name servers until a name server is able to provide an identifier of the data server.

14 Claims, 4 Drawing Sheets

(56) References Cited

U.S. PATENT DOCUMENTS

| | | | | |
|---|---|---|---|---|
| 2006/0083165 | A1* | 4/2006 | McLane | H04L 43/50 370/229 |
| 2012/0185370 | A1* | 7/2012 | Davie | G06Q 30/04 705/34 |
| 2014/0108672 | A1 | 4/2014 | Ou et al. | |
| 2017/0295132 | A1* | 10/2017 | Li | H04L 63/045 |

OTHER PUBLICATIONS

Sheffer et al. "Generating Certificate Requests for Short-Term, Automatically-Renewed (STAR) Certificates", IETF.org, Jun. 29, 2018 [retrieved on Jul. 30, 2022], Retrieved from the Internet: <URL: https://datatracker.ietf.org/doc/pdf/draft-sheffer-acme-star-request-02>. (Year: 2018).*

Sheffer et al. "Support for Short-Term, Automatically-Renewed (STAR) Certificates in Automated Certificate Management Environment (ACME)", IETF.org, Mar. 3, 2018 [retrieved on Jul. 30, 2022], Retrieved from the Internet: <URL: https://datatracker.ietf.org/doc/pdf/draft-ietf-acme-star-03>. (Year: 2018).*

Fieau et al. "HTTPS delegation in CDNI", IETF.org, Jul. 3, 2017 [retrieved on Jul. 30, 2022], Retrieved from the Internet: <URL: https://datatracker.ietf.org/doc/pdf/draft-fieau-cdni-https-delegation-02>. (Year: 2017).*

Barnes et al. "Delegated Credentials for TLS", IETF.org, Oct. 30, 2017 [retrieved on Jul. 30, 2022], Retrieved from the Internet: < URL: https://datatracker.ietf.org/doc/pdf/draft-rescorla-tls-subcerts-02>. (Year: 2017).*

International Search Report dated Apr. 2, 2020 for corresponding International Application No. PCT/FR2019/053028, dated Dec. 11, 2019.

Written Opinion of the International Searching Authority dated Apr. 2, 2020 for corresponding International Application No. PCT/FR2019/053028, filed Dec. 11, 2019.

English translation of the Written Opinion of the International Searching Authority dated Apr. 20, 2020 for corresponding International Application No. PCT/FR2019/053028, filed Dec. 11, 2019.

Sheffer Y. et al., "Use of Short-Term, Automatically-Renewed (STAR) Certificates to Delegate Authority over Web Sites; draft-sheffer-acme-star-01.txt", Use of Short-Term, Automatically-Renewed (STAR) Certificates to Delegate Authority Over Web Sites; draft-sheffer-acme-star-01.txt, Internet Engineering Task Force, IETF; Standardworkingdraft, Internet Society (ISOC) 4, Rue Des Falaises CH—1205 Genev, Apr. 24, 2017 (Apr. 24, 2017), pp. 1-15, XP015119310.

Sheffer Y. et al., "An ACME Profile for Generating Delegated STAR Certificates; draft-ietf-acme-star-delegation-00.txt", Dec. 13, 2018 (Dec. 13, 2018), pp. 1-13, An Acme Profile for Generating Delegated Star Certificates; draft-ietf-acme-star-delegation-00.txt; Internet-Draft: Acme, Internet Engineering Task Force, IETF; Standardworkingdraft, Internet Society Retrieved from the Internet: URL:https://tools.ietf.org/html/draft-ietf-acme-star-delegation-00, XP015130255.

Rescorla E., "The Transport Layer Security (TLS) Protocol Version 1.3", Internet Engineering Task Force (IETF), Request for Comments: 8446, ISSN: 2070-1721, Aug. 2018.

* cited by examiner

METHOD FOR DETERMINING A DELEGATION CHAIN ASSOCIATED WITH A DOMAIN NAME RESOLUTION IN A COMMUNICATION NETWORK

CROSS-REFERENCE TO RELATED APPLICATIONS

This Application is a Section 371 National Stage Application of International Application No. PCT/FR2019/053028, filed Dec. 11, 2019, the content of which is incorporated herein by reference in its entirety, and published as WO 2020/128239 on Jun. 25, 2020, not in English.

1. TECHNICAL FIELD

The invention relates to communication networks and aims to implement a method that makes it possible to implement a secure delegation of a second domain of a DNS (Domain Name System) architecture to a first domain in order for a terminal to obtain an identifier of a data server of the first domain capable of delivering a content, the identifier being initially requested from the second domain.

2. STATE OF THE ART

In communication architectures, the contents are most often distributed to the terminals from data servers which are not necessarily the so-called source servers which initially have the requested contents. For example, if a terminal wants to access the data from the page http://www.example.fr, then these data will probably be transmitted by a CDN server, or in other words a cache server having obtained the data from the source server, hosting the data of the page cited above. The identifier then has to be transmitted from this CDN server to the client, the latter establishing a session with this CDN server to actually obtain the data, for example by establishing an HTTPS (HyperText Transfer Protocol Secure) session, for example of HTTP over TLS (Transport Layer Security) type. These types of architecture notably make it possible to limit access to the source server, reduce the bandwidth consumption in the communication networks by bringing the data servers closer to the terminals, and improve the quality of experience for the clients wanting to access these data.

Thus, a terminal transmitting a request in order to obtain an identifier of a data server to a DNS (Domain Name System) server of a source domain, for example CSP.com, is redirected to a DNS server of a CDN of an operator of a communication network or of an operator of CDN servers for example, responsible for managing CDN servers capable of delivering the contents requested by the terminal. As an example, in the context of the "Edge Computing" architectures that are intended to be implemented in the fifth generation (5G) networks, the delivery of contents by servers close to the terminals makes it possible to reduce the latency relating to the distribution of the contents and therefore improve the quality of experience of the clients and increase the reliability of the data access service by distributing the servers in different domains, a domain representing a set of resources of a communication network administered by one and the same entity.

In the case of the CDN architectures, a CDN server must deliver the content by using the source domain name in order for the terminal to be able to check and ensure that the received content, which does not come from a server of the source domain, originates from a server of a domain having an agreement with the source server. The terminal in fact compares the match between the domain requested in the DNS request initially transmitted and the information on the domain name present in a certificate sent by the data server of the CDN domain. However, for this comparison to be able to be performed, the source domain must transmit the certificate to the CDN domain server together with a private key associated with the source domain. The transmission of the private key in fact poses problems of confidentiality and of security that have to be resolved. The terminal thus obtains a content from a server of a domain for which it does not know the link with the source domain that the terminal has invoked to obtain the content. The document draft-sheffer-acme-star-delegation-01 describes a solution allowing a single delegation by a source server to a third-party server even though the communication network architectures most often interconnect a greater number of domains, these domains not necessarily having all the agreements with the source server.

A domain X involved, for example, in the delivery of a content, can also have agreements with different domains, corresponding to distinct service providers, and can itself invoke another, more appropriate domain Y to provide a data server identifier. Thus, the provision of an identifier of a data server to a terminal can involve a large number of successive domains without a priori control of the source domain initially invoked by the terminal. The sharing of private keys between different domains is not however desirable for security reasons and different domains can be involved in the provision of the identifier of the data server to the terminal depending on the type of data and/or on the timeslot, even depending on the agreements between the different domains for certain services. According to the prior techniques, it is also not possible to control the reliability of the data access service by a priori controls, that is to say before the connection of the terminal to the data server identified in the DNS response transmitted to the terminal, or else a posteriori controls, that is to say once the terminal is connected to the data server.

The object of the present invention is to provide improvements over the state of the art.

3. SUMMARY OF THE INVENTION

The invention improves the situation using a redirection method, relating to the identification of a data server capable of delivering a content to a terminal, the method being implemented by a resolution server of a communication architecture, following the transfer, to a second name server of a second domain, of a message for obtaining an identifier of the data server in the second domain, received from the terminal, the method comprising:
  a step of reception, from the second name server, of a message for redirection to a first domain, said redirection message including a delegation chain comprising a first datum for redirection from the second domain to the first domain,
  at least one step of transmission, to a first name server of the first domain, of a message for obtaining the identifier of the data server in the first domain, the message comprising the received delegation chain,
  at least one step of reception, from the first name server, of an instruction message comprising the delegation chain modified with the addition of a second redirection datum.

The delegation chain comprises a series of redirections from the second domain or source domain to the first domain, comprising the data server, or delivery server, for which an identifier will be transmitted to a terminal. This chain is generated recursively by different name servers of the different domains involved in the delivery of the identifier of the data server storing a content requested by a terminal. Thus, each name server invoked by the resolution server adds to the delegation chain a redirection from the domain in which it is situated to another domain, and it indicates to the resolution server to invoke this other domain to obtain the identifier of the data server. Step-by-step, the resolution server thus establishes the delegation chain. It contacts a name server (or DNS server) of the domain n to which a name server of the domain n−1 has redirected it by adding therein redirection information (domain n−1>domain n) added to the chain, and this server of the domain n communicates to the resolution server of the domain n+1, to which it also adds a redirection to the delegation chain (n>n+1). The delegation chain ends when the name server of an invoked domain is actually able to deliver the identifier of a data server capable of delivering the content to the terminal, this delivery most often being established via a secure connection.

In the method, the second domain is the source domain initially invoked by the resolution server following an obtaining request message received from the terminal. The first domain and the first name server represent the set of domains involved in the delegation chain to finally provide the identifier of the data server. The step of transmission and the step of reception, to or from the name server, correspond to a set of steps of transmission (respectively of reception) to (respectively from) successive domain name servers until the instruction message comprises an identifier of the data server and a redirection from the domain to itself.

The redirection method makes it possible to implement a delegation that is dynamic in time (the redirections can in fact vary in time) and in space (for one and the same content, a server of a given domain can invoke different domains, notably to balance the load over the domains). The method also makes it possible to ensure a step-by-step chain generation service, via the successive redirections, thus improving the availability and the reliability of the established delegation chain by preventing a chain from being established by a single name server of a domain which may not know the different domains that can be involved. The method also avoids having this domain enter into agreements, as necessary, with a large number of domains but to implement agreements between successive domains.

According to one aspect of the invention, the redirection method further comprises a step of transmission, to the second name server, of a control message comprising the delegation chain modified with the second redirection datum.

According to the invention, the generation of the chain is performed step-by-step by invoking a name server of the domain indicated in the redirection information added to the chain by the server of the domain previously invoked. The resolution server can advantageously transmit the modified chain, notably once it is complete and when the identifier of the data server has been received, to the second name server of the second domain initially invoked for this second server to validate or not the established chain knowing that the chain can comprise several successive redirections between domains.

According to another aspect of the invention, the redirection method further comprises a step of reception, from the second name server, of a validation message, including the modified delegation chain and further comprising a chain validation parameter.

The name server of the second domain can advantageously validate the complete delegation chain, for example if all the domains of the chain are compatible with a security policy of the manager of the second domain. The validation message allows the resolution server to ensure the validity of the entire chain. For example, the addition to the received chain of a redirection from the second domain to the domain in which the data server is located, therefore the last domain of the chain received by the second name server, in addition to the successive redirections between the different domains added in the generation of the chain by successive redirections, makes it possible to indicate to the resolution server that the complete delegation chain is validated for the operator of the second domain.

According to another aspect of the invention, the redirection method further comprises a step of reception, from the second name server, of an invalidation message further comprising a chain non-validation parameter.

The name server of the source domain can refuse the delegation chain generated by the resolution server, for example because one of the domains present in the chain does not have an agreement with the second domain or source domain, or because the delegation chain is approaching expiration. In this case, the name server returns the delegation chain received from the resolution server and can add therein an invalidity parameter thus indicating to the resolution server that the chain is invalid. In the case where the second name server does not validate the delegation chain from the second domain to the first domain, then the name resolver can retransmit a request message for the identifier of the data server to the name server of the second domain, the request message comprising the delegation chain and the invalidity parameter. Thus, if the second name server identifies a data server in the second domain, it can inform the resolution server thereof without delegating the provision of the identifier to another domain or else it can re-initiate a delegation for an identifier of a data server and another associated delegation chain to be transmitted to the resolution server.

The various aspects of the redirection method which have just been described can be implemented independently of one another or in combination with one another.

The invention also relates to a method for modifying a delegation chain, relating to the provision of an identifier of a data server, capable of delivering a content to a terminal, the method being implemented by a first name server of a first domain, and comprising:

- at least one step of reception, from the resolution server, of a message for obtaining an identifier of the data server in the first domain, the message comprising a delegation chain including a first datum for redirection from a second domain to the first domain,
- at least one step of modification of the received delegation chain by the addition of a second redirection datum,
- at least one step of transmission, to the resolution server, of an instruction message comprising the modified delegation chain.

A name server of a domain involved in the provision of an identifier of a data server redirects a request to obtain the identifier, initially transmitted by a terminal and relayed by a resolution server, to a name server of another domain if it cannot provide this identifier or if it considers that another domain is better able to provide the identifier, or even if it knows which other domain to invoke to provide this identifier. The name server also adds the redirection indication in a delegation chain contained in the instruction message transmitted to the name server of the other domain. Step-by-step, the series of redirections between the second domain and the domain in which the identifier is located is constructed, thus making it possible to construct a delegation chain comprising the different redirections determined between the domains successively invoked. These redirections are executed until a name server of a domain can transmit the identifier of the data server to the resolution server.

According to another aspect of the invention, in the modification method, the added second redirection datum is a redirection from the first domain to the first domain.

The information for redirection from the first domain to itself allows the resolution server responsible for the transmission of the chain to the terminal to be able to identify the last redirection and to be able to immediately transmit the identifier of the data server and the complete delegation chain to the terminal.

According to another aspect of the invention, in the modification method, the second redirection datum is a chain invalidity datum.

Each name server involved in the redirections and therefore in the generation of the delegation chain can indicate to the resolution server that the delegation chain is not valid. This may be the case if the preceding redirection of the chain redirects to an unreliable domain or if a period of validity of the chain is close to being reached. The resolution server can then take any decision to inform the terminal thereof and/or to determine a new chain.

According to another aspect of the invention, in the modification method, the added second redirection datum is a redirection from the first domain to a third domain.

The instruction message advantageously informs the resolution server that the request to obtain the identifier of the data server must be transmitted to a name server of a third domain if the data server is not in the first domain or if the first name server prefers to indicate to the resolution server that a delegated domain can transmit the identifier of the data server. The instruction message comprises, for example, a DNS message of CNAME type. The redirection datum, in this case, is a redirection from the first domain to the third domain, added to an existing redirection from the second domain to the first domain. According to another aspect of the invention, in the modification method, the instruction message further comprises an identifier of the data server in the first domain.

If the data server for which an identifier is requested by the terminal is located in the second domain, then the instruction message does not comprise a redirection datum but an identifier of a data server in the first domain, for example an IP address belonging to the addressing plan of the first domain. It is then an IP address of a data server such as an "Edge" server of the domain. The resolution server thus receives the information desired initially, that is to say upon the invocation of the second name server of the second domain. The first name server then transmits the identifier of the data server, but also all the redirections between domains that had led to the identification of the data server in a domain other than the one invoked initially. The resolution server can thus ensure that the first domain has been selected in accordance with the successive delegations possibly via other intermediate domains. The delegation chain possibly comprises a redirection from the first domain to itself thus indicating to the resolution server the end of the delegation chain.

According to another aspect of the invention, in the modification method, the modified chain further comprises a signature datum relating to the first domain.

The chain can advantageously be signed step-by-step by the name servers of respective domains of the delegation chain to authenticate the name servers and ensure the authenticity of the domains involved in the generation of the delegation chain. Each domain can thus add its own signature, for example with its private key, which will be decrypted by the resolution server, even by the terminal if it succeeds in doing so, making it possible to ensure that the domains involved in the chain are authentic.

According to another aspect of the invention, in the modification method, the modified chain further comprises a chain validity time.

A domain can indicate to another domain that the redirection added to the existing delegation chain is valid only for a defined time, thus allowing redirection policies between domains that are dynamic in time and the implementation of redirections to respond, for example, to limited time congestions in the domains.

According to another aspect of the invention, in the modification method, the at least one modification step further comprises a step of validation of the received chain and a step of signing of the added second redirection datum. The second server can advantageously validate the received chain, for example by checking the identity of the domain having added the preceding delegation. It also signs the redirection that it adds to the validation chain, for example with a private key, so that the name server of the next domain can in turn check the authenticity of the redirection added by the name server.

The various aspects of the modification method which have just been described can be implemented independently of one another or in combination with one another.

The invention also relates to a redirection device, relating to the identification of a data server capable of delivering a content to a terminal, in a resolution server of a communication architecture, comprising:
  a transfer module, capable of transferring, to a second name server of a second domain, a message for obtaining an identifier of the data server in a second domain, received from a terminal,
  a receiver,
  capable of receiving, from the second name server, a message for redirection to a first domain, said redirection message including a delegation chain comprising a first datum for redirection from the second domain to the first domain,
  capable of receiving, from a first name server, at least one instruction message comprising the delegation chain modified with the addition of a second redirection datum,
  a transmitter, capable of transmitting, to the first name server, at least one message for obtaining an identifier of the data server in the first domain, the message comprising the received delegation chain.

This device, capable in all its embodiments of implementing the redirection method which has just been described, is intended to be implemented in a name resolver, for example a DNS resolver, and can be instantiated in a terminal, fixed or mobile, or else in an access unit of a domestic or professional network (box) or else in a specific unit of an operator network.

The invention also relates to a device for modifying a delegation chain relating to the provision of an identifier of a data server, capable of delivering a content to a terminal, implemented in a first name server of a first domain, and comprising:

a receiver, capable of receiving, from a resolution server, at least one message for obtaining an identifier of the data server in the first domain, the message comprising a delegation chain including a first datum for redirection from a second domain to the first domain,     a modification module, capable of at least once modifying the received delegation chain by the addition of a second redirection datum,     a transmitter, capable of transmitting, to the resolution server, at least one instruction message comprising the modified delegation chain.

This device, capable in all its embodiments of implementing the modification method which has just been described, is intended to be implemented in a name server, for example a DNS server or in any type of server associating an identifier (IP address, mail address, private identifier of a network) with a name.

The invention also relates to a redirection system relating to the identification of a data server capable of delivering a content to a terminal, comprising:

a redirection device, a modification device.

The invention also relates to a computer program comprising instructions for the implementation of the steps of the redirection method which has just been described, when this program is executed by a processor and a storage medium that can be read by a redirection device on which the computer program is stored.

The invention also relates to a computer program comprising instructions for the implementation of the steps of the modification method which has just been described, when this program is executed by a processor and a storage medium that can be read by a modification device on which the computer program is stored.

These programs can use any programming language, or be in the form of source code, object code, or intermediate code between source code and object code, such as in a partially compiled form, or in any other desirable form.

The invention also targets an information medium that can be read by a computer, and comprising instructions of the computer programs as mentioned above.

The information medium can be any entity or device capable of storing the programs. For example, the medium can comprise a storage means, such as a ROM, for example a CD-ROM or a microelectronic circuit ROM, or even a magnetic storage means, for example on a hard disk.

Also, the information medium can be a transmissible medium such as an electrical or optical signal, which can be conveyed via an electrical or optical cable, wirelessly or by other means. The programs according to the invention can in particular be downloaded over a network of Internet type.

Alternatively, the information medium can be an integrated circuit in which the programs are incorporated, the circuit being adapted to execute or to be used in the execution of the methods concerned.

4. BRIEF DESCRIPTION OF THE DRAWINGS

Other advantages and features of the invention will become more clearly apparent on reading the following description of a particular embodiment of the invention, given as a simple illustrative and nonlimiting example, and the attached drawings, in which.

5. DESCRIPTION OF THE EMBODIMENTS

Hereinafter in the description, embodiments of the invention are presented in a communication infrastructure. This infrastructure can be fixed or mobile and the invention can be intended for the acquisition of an identifier of a data server for enterprise clients or so-called residential clients or the general public.

Figure 1:
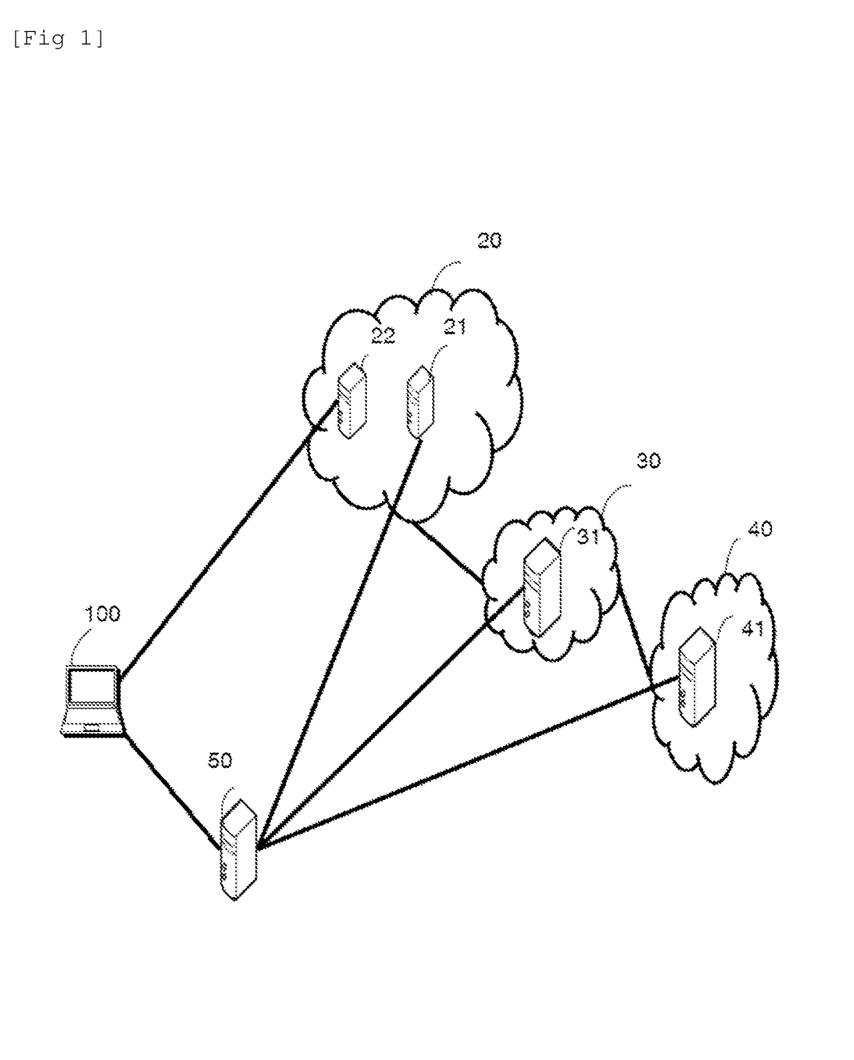
FIG. 1 presents a simplified view of a communication architecture in which the invention is implemented according to one aspect of the invention.

Reference is made first of all to FIG. 1, which presents a simplified view of a communication architecture in which the invention is implemented according to one aspect of the invention.

A terminal 100, which can be a fixed terminal or a mobile terminal, wants to obtain a content of a remote server by using the HTTPS protocol. For example, the content of the remote server is as follows: https://www.abc.com. The terminal 100 therefore transmits a request for resolution of the name https://www.abc.com to obtain a network identifier, for example an IP (Internet Protocol) address of IPv4 or IPv6 type, corresponding to this name. The terminal 100 therefore invokes a resolution server 50 to obtain the network identifier of the server storing the content. The request for obtaining the identifier of the source server sent by the terminal 100, according to one alternative, can comprise a delegation parameter indicating in particular that the terminal 100 supports the "delegation" function and ordering the resolution server 50 to request the information relating to the delegation. The resolution server 50 is, for example, a device of DNS (Domain Name System) resolver type. This DNS resolver can be incorporated in the terminal 100, or else be implemented in a local area network to which the terminal 100 is attached, or even one operated by an operator managing the access network to which the terminal 100 is attached. The resolution server 50, not having any record associating a network identifier with the name, corresponding in this case to an address, initiates a redirection method in order to establish a delegation chain to obtain the identifier of a data server hosting the content. It invokes a name server 41, for example a DNS server, of the source domain 40 abc.com, to obtain the network identifier by transmitting a request message comprising the delegation parameter received from the terminal 100. The resolution server 50, according to one example, may have been redirected to the name server 41 of the source domain after having transmitted a request allowing it to obtain an identifier of the name server 41 to other services, such as so-called root servers and/or servers of the .com domain before being actually able to connect to the name server 41.

It is considered in this request that the content https://www.abc.com is replicated in so-called local servers allowing the terminals to access the replicated content with a lesser latency and allowing a lesser consumption of the communication resources. The server 41 determines another domain 30 to which to redirect the resolution server 50. The name server 41 responds to the resolution server 50 by transmitting an instruction message indicating that the IP address of a server storing the content can be obtained by transmitting a request to a name server 31 of the domain 30. The redirection message thus comprises a delegation chain indicating the redirection by the domain 40 to the domain 30.

On reception of this redirection message, the resolution server 50 transmits a request message to obtain the identifier of a server storing the content https://www.abc.com to the name server 31 of the domain 30. This request further comprises the delegation chain received from the server 41. The server 31 responds to the resolution server 50 by redirecting it to the name server 21 of the domain 20 after having modified the delegation chain with the added new redirection from the domain 30 to the domain 20. This modified chain is also transmitted to the domain 20.

The resolution server 50 next invokes the name server 21, in accordance with the redirection obtained previously, by attaching the modified chain, to obtain the content https://www.abc.com. Knowing the IP address of a server 22 in the domain 20 hosting the content requested by the terminal 100, the server 21 communicates it to the resolution server 50 in an instruction message further comprising the complete delegation chain from the source domain 40 to the domain 20, that is to say from the domain 40 to the domain 30 then from the domain 30 to the domain 20, in which the data server 22 capable of delivering the content to the terminal 100 is located.

The resolution server 50 transmits this information message to the terminal 100 which then obtains the IP address of the data server 22 to which to transmit a request to obtain the content and the complete delegation chain received from the resolution server 50. The terminal 100, according to one example, then transmits a connection setup message, such as a message of HTTP/TLS (Transport Layer Security) type, to the server 22, this method comprising the received delegation chain. The server 22, in return, transmits a message accepting the connection from the server 22 delivering the content to the terminal 100.

Figure 2:
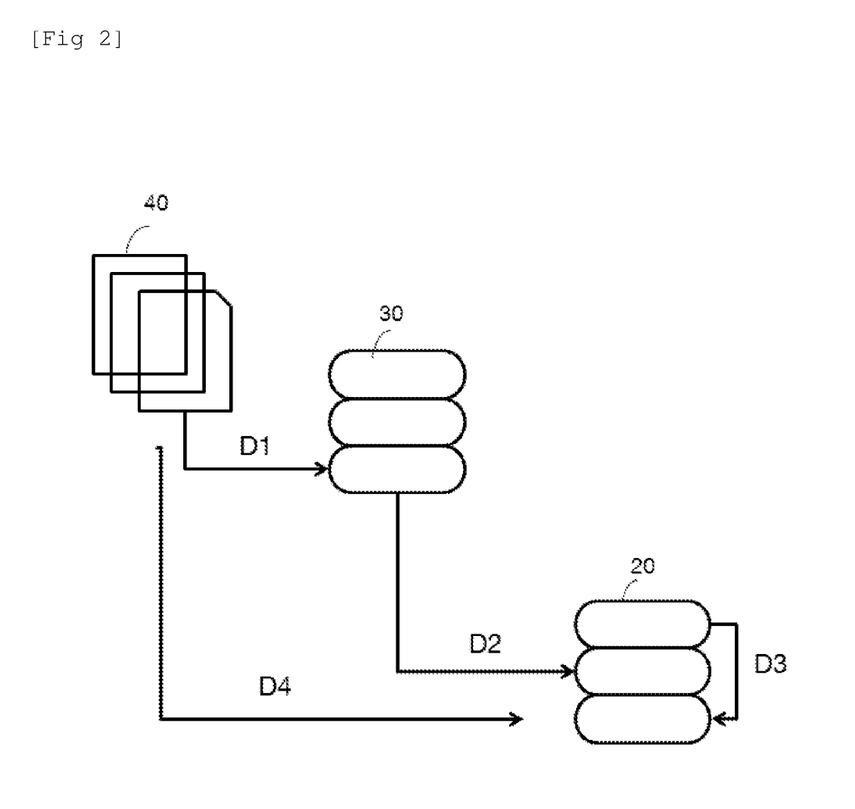
FIG. 2 presents the generation of a delegation chain according to one aspect of the invention.

In relation to FIG. 2, the generation of a delegation chain, comprising a series of redirections is presented according to one aspect of the invention.

In this figure, the three domains 20, 30, 40 presented in FIG. 1 are also represented. It is considered in this embodiment that the three domains 20, 30, 40 correspond to CDN networks (Content Delivery Networks) but they may also be operator networks or even storage (cloud) infrastructures located in different places. The domain 40 comprises a data server of which one terminal, not represented in this figure, wants to obtain the identifier to then request data from this server. The identifier of the data server of the domain 40 is not transmitted to the terminal but a series of redirections will be applied between the different domains 40, 30, 20 for a data server, closer to the terminal and/or better able to satisfy the request from the terminal and/or having more resources for transmitting the data to the terminal, to be identified and transmitted to the terminal. In the present case an identifier of a data server of the CDN domain 20 will be transmitted to the terminal. A series of redirections from the domain 40 to the domain 20 must be put in place transparently for the terminal which has to be able to check and adapt its behavior in accordance with the redirections. According to one alternative, the domain 40, called source domain, can also validate or not validate the various redirections, for example in accordance with the agreements with the various domains present in the chain which comprises the successive redirections. This FIG. 2 presents the redirections of a delegation chain and the various information potentially present in the chain but does not present the exchanges with a resolution server. FIG. 2 presents a summary view of a method for redirection between domains, the elements D1, D2, D3, D4 not representing exchanges between the domains 40, 30, 20 but the principle of generation of a delegation chain from the successive redirection information.

Upon the reception, by a name server of the domain 40, of a request to obtain the identifier (name, IP address, etc.) of a data server hosting a content desired by a terminal, the name server (DNS) can indicate the identifier of a data server (HTTP server, FTP (File Transfer Protocol) server, etc.) of the domain 40 or else redirect the resolution server, the agent of the terminal for obtaining the identifier, to a name server of another domain. This second option is used by the DNS server of the domain 40 which delegates, to a DNS server of the domain 30, the provision of an identifier of the data server. The domain 40 delegates to the domain 30 the response to the request to obtain the identifier sent by the resolution server. And, the domain 30 does the same to delegate to the domain 20 the response to be transmitted to the resolution server, thus contributing to the generation of the delegation chain. In FIG. 2, D1 comprises delegation information from the domain 40 to the domain 30, this information being transmitted to the resolution server, and D2 comprises delegation information from the domain 30 to the domain 20, also transmitted to the resolution server. The chain comprises the complete delegation information D4 from the domain 40 to the domain 20 including the information D1 and D2 and possibly the information D3 from the redirection domain 20 to itself. The delegation chain can thus comprise a large quantity of successive delegation information. The complete chain, when it comprises the delegation information D3 from the domain 20 to itself allows the resolution server to identify the end of the delegation chain in order to facilitate the future processing operations and thus indicate that the chain is complete. A name server of a domain thus indicates another domain that the resolution server must invoke, after having modified the delegation chain with the addition of a redirection to the domain that the resolution server must invoke.

To obtain the complete delegation chain, it is necessary to interrogate a name server of all the domains involved in the DNS resolution ultimately making it possible to obtain the identifier of the data server. The delegation chain D1 comprises, according to one example, a set of elements corresponding to a block, such as:

From: Name of the delegating domain—CDN1 40
To: Name of the delegated domain—CDN2 30
Start_time: Delegation start time (UTC Time)
Validity: Time in seconds from Start_time
signature algorithm: signature hash+algorithm–name of the algorithm used to check the delegation chain. The possible values are defined in the document IETF RFC 8446 section 4.2.3
Signature: contains the signature with a certificate used to authenticate the name of the domain present in the "From" field.

The signature field, added according to one alternative, makes it possible to prove the authenticity of each redirection of a delegation chain, implicitly by checking the content and the identity of the signature. It is applied iteratively when a new redirection is added to an existing chain. Each new block, corresponding to a delegation from one domain to another, acknowledges the preceding delegation and proves the authenticity of the new one. The private key used to sign each block is that of the certificate of the domain which is currently delegating (From field). It should be noted that the redirection information is composed of the information from the "from" and "to" fields of a block. The information of the chain D4 therefore comprises the two data blocks D1 and D2 corresponding to the successive delegations from the domain CDN1 40 to the domain CDN2 30 then from the domain CDN2 30 to the domain CDN3 20 and possibly a third data block D3 corresponding to a delegation from the domain CDN3 20 to itself.

The redirection information of the blocks, therefore the "From" and "To" fields, must be present while the other information of the blocks, relating to the delegation time and to security, are optional. The chains, composed of blocks, are received by the name servers of the domains, from a resolution server, then modified by adding a block comprising a redirection and possibly a lifetime of the chain and a signature, then returned to the resolution server. Thus, the resolution server invokes a name server of the domain 40, receives in turn a redirection message comprising a delegation chain comprising the information D1 for redirection to the domain 30. The resolution server transmits a method to obtain the identifier of the data server, comprising the received chain, to a name server of the domain 30. This name server, not being in a domain comprising an identifier of the data server, identifies a domain to which to redirect the resolution server, and modifies the chain by adding the data block D2. It sends the chain (D1+D2) in an instruction message to the resolution server. The resolution server invokes a name server of the domain 20. Since the domain 20 comprises a data server, the name server modifies the received chain by adding the block D3 and transmits the modified chain, comprising the data blocks D1, D2, D3, to the resolution server.

Figure 3:
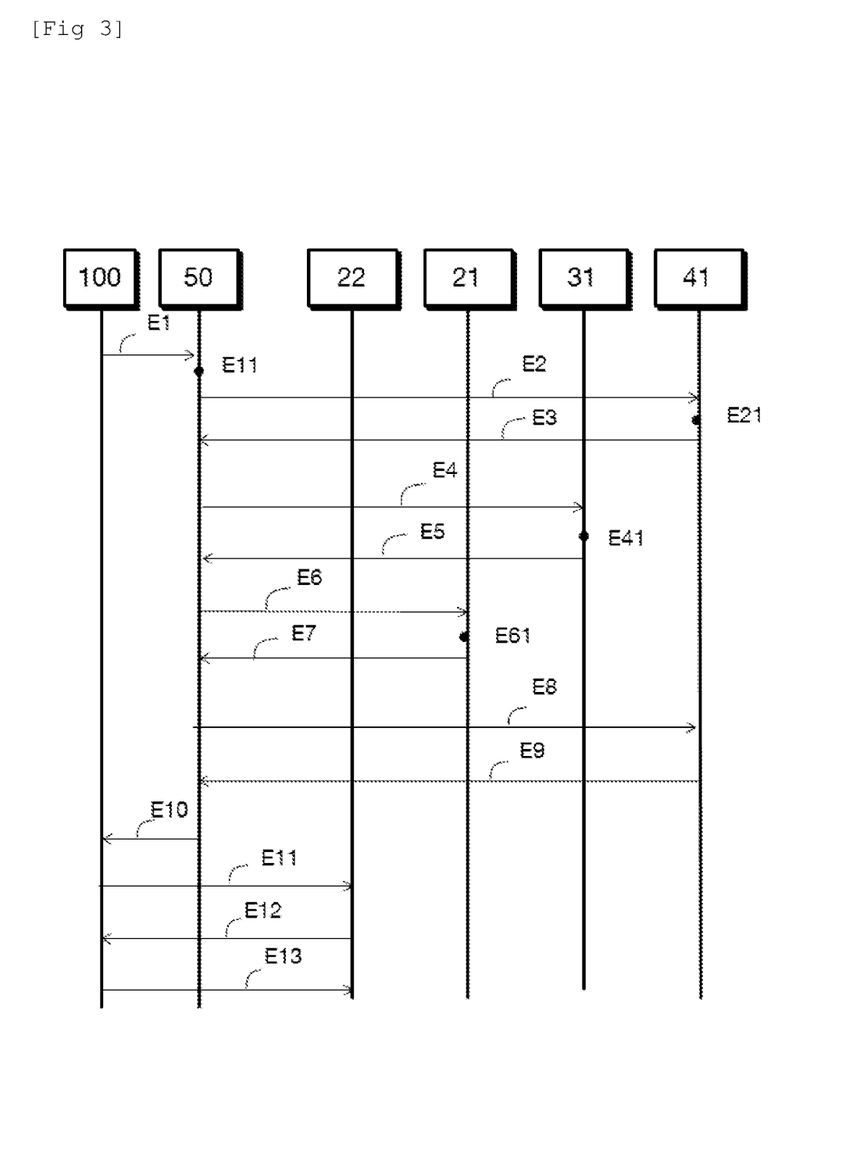
FIG. 3 presents an overview of the method for acquiring an identifier of a first data server according to an embodiment of the invention.

Reference is now made to FIG. 3 which presents an overview of the method for acquiring an identifier of a data server according to an embodiment of the invention.

In the step E1, the terminal 100 transmits a request message to obtain an identifier of a data server, represented here by a DNS request, to the device 50 which is of DNS resolver type. This DNS request is sent by the terminal 100 to know the identity of a data server in a given domain capable of delivering a content requested by the terminal 100. The DNS request is, for example, of "DNS Query A cdn.co.com" type and the terminal wants to obtain an IP address corresponding to the type A (address) record of the domain name cdn.co.com. According to one example, this request comprises a delegation parameter, for example an empty delegation chain Delegation ( ), because no delegation has taken place for the time being. The DNS resolver 50 can be in the terminal 100, in a local area network to which the terminal 100 is attached or even in a network managed by an operator.

The DNS resolver 50, in the step E11, sets up a process for determining a delegation chain associated with the acquisition of the identifier of the data server requested by the terminal 100. This determination is an iterative process between the DNS resolver 50 and the different name servers of the domains involved in the redirections comprised in the delegation chain.

The DNS resolver, following the request transmitted by the terminal 100 in the step E1, transmits a request message for an identifier of a data server corresponding to cdn.co.com in the step E2. This message is in fact transmitted to a so-called authority DNS server for the domain cdn.co.com. Knowing that cdn.co.com contains at least three domains, namely, the domains .com, co.com and cdn.co.com, the DNS resolver 50 can invoke an authority DNS server of the domain .com then an authority DNS server of the domain co.com before invoking a DNS server of the domain cdn.co.com. In the example of FIG. 3, only the sending of the request message to a DNS server 41 of the domain cdn.co.com is represented. In the step E2, the DNS server 41 is identified as the source server because it is the first DNS server invoked by the DNS resolver 50 to obtain the identifier of a data server. The DNS resolver 50 includes an empty delegation chain, possibly received from the terminal 100, in the request message transmitted to the DNS server 41. The DNS resolver 50 transmits the following message:

DNS query A cdn.co.com
Extension: Delegation ( )

In the step E21, the DNS server 41 modifies the delegation chain by adding a redirection from the domain cdn.co.com to the domain co.cdn1.com. In the step E3, the DNS server 41, having determined a domain to which the DNS resolver 50 must be redirected and after having modified the chain accordingly in the step E21, sends a redirection message to the DNS resolver 50 to indicate to it that the content can be obtained from the domain co.cdn1.com. It thus creates the first level of delegation to co.cdn1.com and has therefore modified the delegation chain by adding a data block to the delegation chain received in the step E2. This is the first occurrence of the delegation chain, this occurrence corresponding to a redirection from the domain cdn.co.com to the domain co.cdn1.com. This chain can, according to one example, comprise a time of validity of the chain. According to another example, the chain can also comprise a chain authentication datum, such as a certificate of the server 41. The redirection message is a message of DNS CNAME (Canonical Name) type indicating to the resolver 51 to invoke an authority DNS server of the domain cdn1.co.com. The content of the redirection message transmitted by the server 41 to the DNS resolver 50 is as follows:

DNS answer CNAME co.cdn1.com
Extension: Delegation
  from: cdn.co.com,
  to: co.cdn1.com, )

The name server 41 has thus implemented a method for modifying the delegation chain with a redirection from the domain cdn.co.com to the domain co.cdn1.com.

On reception of the redirection message, the DNS resolver 50 transmits, in the step E4, to an authority DNS server 31 of the domain cdn1.co.com, a message requesting the identifier of the domain indicated by the DNS server 41 in its redirection message. This request message comprises the delegation chain updated by the server 41 in the step E21. The content of the message transmitted by the resolution server 50 is as follows:

DNS query A co.cdn1.com
Extension: Delegation (
  from: cdn.co.com,
  to: co.cdn1.com, )

Determining that the DNS server 31 has a record co.cdn2.com to which the DNS resolver 50 must be redirected to obtain an identifier of a data server, the DNS server 31, in the step E41, modifies the delegation chain received in the step E4 with a redirection from co.cdn1.com to co.cdn2.com. The DNS server 31 of the domain co.cdn1.com transmits an instruction message, corresponding to a redirection, to the DNS resolver 50, this message comprising the delegation chain modified with the addition of the redirection from the domain co.cdn1.com to the domain co.cdn2.com. The modification of the chain in the step E41, according to one example, also comprises a step of validation of the received chain "from: cdn.co.com to: co.cdn1.com", for example by checking the authenticity of a certificate added by the server 41 of the domain cdn.co.com and a step of signing of the modified chain by signing the data block added to the delegation chain with a private key specific to the server 31. The content of the message transmitted by the server 31 in the step E5 is as follows:

DNS answer CNAME co.cdn2.com
Extension: Delegation (
  from: cdn.co.com,
  to: co.cdn1.com,
  from: co.cdn1.com,
  to: co.cdn2.com, )

The DNS server 31 may not validate the received delegation chain for example because the agreement between the domain of the DNS server 31 and the domain of the name DNS server 41 has expired or because a chain validity time has expired or is close to expiry, or even if a domain present in the chain is not reliable. In this case, the instruction message sent by the DNS server 31 comprises a chain invalidity datum and the resolution server 50 can inform the terminal 100 thereof and/or determine a new delegation chain.

In the same way as in the step E4, the DNS resolver 50, in the step E6, transmits a message requesting an identifier of a data server in the domain cdn2.co.com to a DNS server 21 of the domain co.cdn2.com. The request message comprises the delegation chain modified by the server 31 and the content of the message is as follows:

DNS query A co.cdn2.com
Extension: Delegation (
  from: cdn.co.com,
  to: co.cdn1.com,
  from: co.cdn1.com,
  to: co.cdn2.com, )

The DNS server 21 is able to indicate an identifier of a data server in the domain co.cdn2.com to the DNS resolver 50. In the step E7, it therefore decides to send an instruction message, in this case a DNS response message comprising the IP address of the data server 22 and the delegation chain modified in the step E61 with the addition of a delegation from the domain co.cdn2.com to itself. The DNS server 21 in fact adds to the chain received from the DNS resolver 50 a redirection from the domain co.cdn2.com to itself, thus indicating the end of delegation chain to the devices using this chain. The message transmitted in the step E7 by the DNS server 21 to the DNS resolver 50 is as follows: DNS answer A IP@co.cdn2.com
  Extension: Delegation (
    from: cdn.co.com,
    to: co.cdn1.com,
    from: co.cdn1.com,
    to: co.cdn2.com,
    from: co.cdn2.com,
    to: co.cdn2.com)

The DNS resolver 50 knows, on reception of the instruction message, the domain co.cdn2.com responsible for the delivery of the content and the identifier, in this case the IP address, of the server 22 of the domain co.cdn2.com responsible for the delivery of the content.

According to one alternative, the DNS resolver 50, in the step E8, transmits, to the DNS server 41 of the domain cdn.co.com, a control message comprising the delegation chain modified by the server 21. The message transmitted by the DNS resolver 50 is as follows:

DNS query CNAME cdn.co.com
Extension: Delegation (
  from: cdn.co.com,
  to: co.cdn1.com,
  from: co.cdn1.com,
  to: co.cdn2.com,
  from: co.cdn2.com,
  to: co.cdn2.com, )

According to one example, the server 41 can validate or invalidate the generated delegation chain. Thus, if a domain of the chain has no agreement with the domain cdn.co.com and/or if a domain is not secured, then the server DNS 41 can, according to one alternative, invalidate the chain and, in the step E9, send a chain invalidation message, this message comprising a parameter indicating that the delegation chain is not valid. On reception of this message indicating that the delegation chain is not valid, the DNS resolver 50 can transmit, to the name DNS server 41, a new request to obtain the identifier of a data server in the domain cdn.co.com with the chain invalidity parameter thus indicating to the name server 41 either to transmit a new redirection or to transmit, to the name resolver 50, an identifier of a name server of the domain cdn.co.com without redirection. According to another example, if the DNS server 41 validates the chain, it transmits a validation message to the DNS resolver 50. This validation message, to indicate the validation of the chain, comprises, according to one alternative, a modification of the chain with a redirection from the domain cdn.co.com to the domain cdn2.co.com, and possibly a chain validity parameter. The validation message then takes the following form:

DNS query CNAME cdn.co.com
Extension: Delegation (
  from: cdn.co.com,
  to: co.cdn1.com,
  from: co.cdn1.com,
  to: co.cdn2.com,
  from: co.cdn2.com,
  to: co.cdn2.com,
  from: cdn.co.com,
  to: co.cdn2.com, valid chain)

The resolver 50 then transmits, to the terminal 100, an information message comprising the identifier of the data server 22. This is, according to this example, a DNS message comprising the IP address of the data server 22 and also comprising the delegation chain generated and possibly approved by the server 41. The message received by the terminal 100 in the step E10 is as follows:

DNS answer A IP@co.cdn2.com
Extension: Delegation (
  from: cdn.co.com,
  to: co.cdn1.com,
  from: co.cdn1.com,
  to: co.cdn2.com,
  from: co.cdn2.com
  to: co.cdn2.com,
  from: cdn.co.com,
  to: co.cdn2.com, )

The DNS resolver has thus implemented a redirection method making it possible to establish the delegation chain that has made it possible to determine and transmit, to the terminal 100, the identifier of the data delivery server 22. The delegation chain comprises the successive redirections between domains. The chain transmitted to the terminal 100, according to one example, comprises a chain validity time. The terminal 100, once it has this information (IP address of the data server 22, redirections and optional parameters of the delegation chain) can, according to one alternative, establish a connection with the data server 22. In the step E11, the terminal 100, according to one example, establishes a TLS connection with the data server 22 to which the IP address specific to the domain co.cdn2.com was transmitted in the step E10, by transmitting a TLS Client Hello message. The SNI (Server Name Indication) extension of the TLS Client Hello message comprises, according to one example, the domain name cdn.co.com because it is the domain initially invoked by the terminal 100. The TLS Client Hello message further comprises the delegation chain received from the DNS resolver 50, thus indicating to the data server 22 that the terminal 100 is invoking it in accordance with a delegation chain received, and possibly approved, by the domain cdn.co.com, the DNS resolver 50 and the terminal 100. The content of the TLS Client Hello message is as follows:

TLS ClientHello
Extension: Server Name Indication (cdn.co.com)
Extension: Delegation (
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com)

In the step E12, the data server 22 transmits a connection acceptance message to the terminal 100. For example, it transmits a TLS Server Hello message to the terminal 100.

In the step E13, according to one example, the data server 22 sends a message communicating at least one certificate associated with the delegation chain to the terminal 100. This message is, for example, a TLS ServerCertificate message containing a certificate of the domain cdn.co.com and the complete path of the certificate corresponding to the successive validations of the domains of the delegation chain. It adds a certificate for co.cdn2.com, and the delegation chain proving the delegation. Thus, the terminal 100 has a certificate of the domain co.cdn2.com, a delegation chain indicating the successive redirections between domains and a series of certificates ensuring the authenticity of the domains of the chain. The terminal can therefore, completely securely, use the certificate of the domain co.cdn2.com for the subsequent exchanges between the terminal 100 and the data server 22, and notably for the exchanges relating to the exchanges of data encryption keys.

The TLS ServerCertificate message comprises, for example, the following information:

TLS ServerCertificate
Certificate: cdn.co.com
Certificate: co.cdn2.com
Extension: Delegation
   from: cdn.co.com,
   to: co.cdn1.com,
   from: co.cdn1.com,
   to: co.cdn2.com,
   from: co.cdn2.com,
   to: co.cdn2.com,
   from: cdn.co.com,
   to: co.cdn2.com, )

In the future TLS exchanges, the terminal 100 will thus be able to use the certificate of the delegated domain, co.cdn2.com, for the "TLS Handshake" exchanges instead of the certificate of the source domain cdn.co.com.

The invention has thus made it possible to delegate the provision of an identifier of a data server to a terminal, the data server being in a domain distinct from the domain initially invoked by the terminal, by successive redirections between intermediate domains. These redirections form a delegation chain generated by successive iteration between a resolution server and name servers of the different domains involved in the provision. The invention thus makes it possible to implement a dynamic and secure delegation between domains without requiring the exchange of private keys between the domains. Indeed, the invention makes it possible for the different domains to be able to be involved in the method of redirection by the resolution server 50 without prior agreements, each of the domains determining, as the redirections take place, the next domain of the chain and consequently modifying the delegation chain, until a domain decides or is able to transmit the identifier of the data server in its domain to the resolution server 50. The terminal can thus then exploit the information of the chain and the data for authenticating the information of the chain to establish a secure session to the domain finally indicated in the chain.

It should be noted that, in FIG. 3, the information present in the delegation chain only comprises redirections between domains, but the chain can comprise additional data relating to the lifetime of the chain, to the security data relating to the chain, in accordance with the information in the data blocks presented in FIG. 2.

Figure 4:
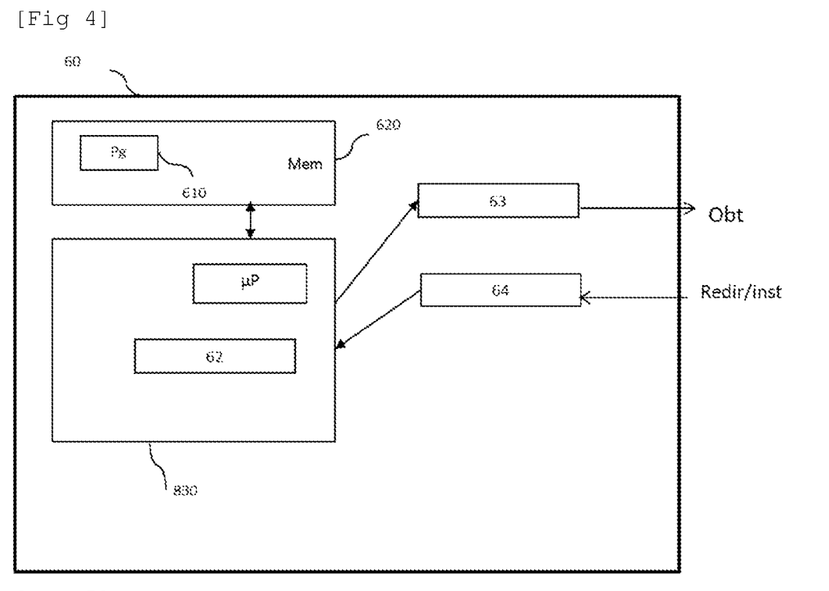
FIG. 4 presents an example of a structure of a redirection device according to one aspect of the invention.

In relation to FIG. 4, an example of a structure of a redirection device is presented according to one aspect of the invention.

The redirection device 60 implements the redirection method, various embodiments of which have just been described.

Such a redirection device 60 can be implemented in a name resolver, for example a DNS resolver, and can be instantiated in a terminal, fixed or mobile, or else in an access unit of a domestic or professional network (box) or else in a specific unit of an operator network.

For example, the device 60 comprises a processing unit 630, equipped for example with a microprocessor μP, and driven by a computer program 610, stored in a memory 620 and implementing the redirection method according to the invention. On initialization, the code instructions of the computer program 610 are for example loaded into a RAM memory, before being executed by the processor of the processing unit 630.

Such a device 60 comprises:
- a transfer module 62, capable of transferring, to a second name server of a second domain, a message for obtaining an identifier of the data server in a second domain, received from a terminal,
- a receiver 64,
capable of receiving, from the second name server, a Redir message for redirection to a first domain, said redirection message including a delegation chain comprising a first datum for redirection from the second domain to the first domain,
capable of receiving, from a first name server, at least one Inst instruction message comprising the delegation chain modified with the addition of a second redirection datum,
- a transmitter 63, capable of transmitting, to the first name server, at least one Obt message for obtaining an identifier of the data server in the first domain, the message comprising the received delegation chain.

Figure 5:
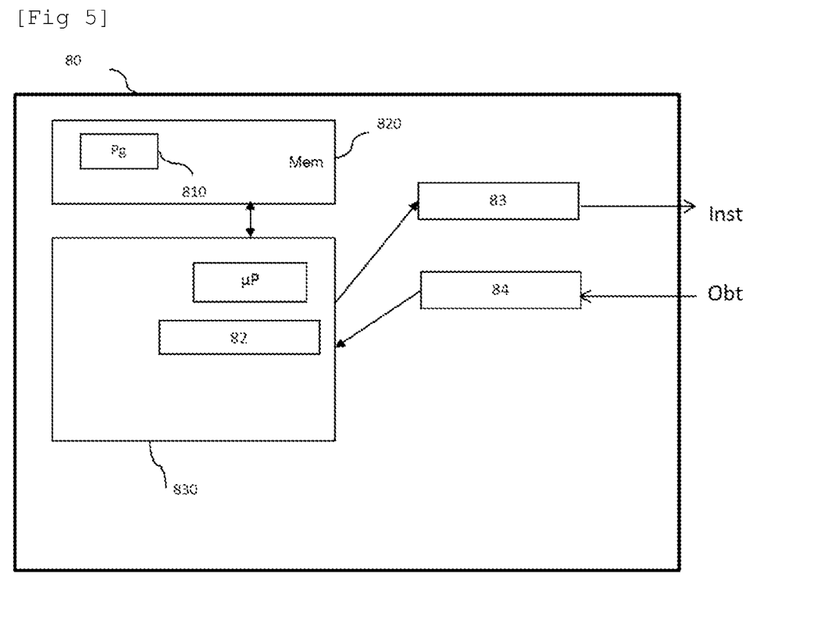
FIG. 5 presents an example of a structure of a modification device according to one aspect of the invention.

In relation to FIG. 5, an example of a structure of a modification device is presented according to one aspect of the invention.

The device 80 implements the modification method, of which various embodiments have just been described.

Such a device 80 can be implemented in a name server, for example a DNS server, or in any type of server associating an identifier (IP address, mail address, private identifier of a network) with a name. The device 80 can be instantiated in a fixed or mobile communication architecture.

For example, the device 80 comprises a processing unit 830, equipped for example with a microprocessor µP, and driven by a computer program 810, stored in a memory 820 and implementing the modification method according to the invention. On initialization, the code instructions of the computer program 810 are for example loaded into a RAM memory, before being executed by the processor of the processing unit 830.

Such a device 80 comprises:
- a receiver 84, capable of receiving, from a resolution server, at least one Obt message for obtaining an identifier of the data server in the first domain, the message comprising a delegation chain including a first datum for redirection from a second domain to the first domain,
- a modification module 82, capable of at least once modifying the received delegation chain by the addition of a second redirection datum,
- a transmitter 83, capable of transmitting, to the resolution server, at least one Inst instruction message comprising the modified delegation chain.

Although the present disclosure has been described with reference to one or more examples, workers skilled in the art will recognize that changes may be made in form and detail without departing from the scope of the disclosure and/or the appended claims.

The invention claimed is:

1. A redirection method, relating to identification of a data server capable of delivering a content to a terminal, the method being implemented by a resolution server of a communication architecture and comprising:
   following a transfer, to a second name server of a second domain, of a domain name system (DNS) request message for obtaining an identifier of the data server in the second domain, received from the terminal:
   receiving, from the second name server, a message for redirection to a first domain, said redirection message including a delegation chain comprising a first datum for redirection from the second domain to the first domain,
   at least one step of transmitting, to a first name server of the first domain, a DNS request message for obtaining the identifier of the data server in the first domain, the transmitted DNS request message comprising the received delegation chain,
   at least one step of receiving, from the first name server, an instruction message comprising the delegation chain modified with an addition of a second redirection datum, and
   transmitting, to the second name server, a control message comprising the delegation chain modified with the second redirection datum added by the first name server.

2. The redirection method as claimed in claim 1, further comprising receiving, from the second name server, a validation message, including the modified delegation chain and further comprising a chain validation parameter.

3. The redirection method as claimed in claim 1, further comprising receiving, from the second name server, an invalidation message further comprising a chain non-validation parameter.

4. A method for modifying a delegation chain, relating to provision of an identifier of a data server, capable of delivering a content to a terminal, the method being implemented by a first name server of a first domain, and comprising:
   at least one step of receiving, from the resolution server, a domain name system (DNS) request message for obtaining an identifier of the data server in the first domain, the DNS request message comprising a delegation chain including a first datum for redirection from a second domain to the first domain,
   at least one step of modifying the received delegation chain by an addition of a second redirection datum, and
   at least one step of transmitting, to the resolution server, an instruction message comprising the modified delegation chain.

5. The modification method as claimed in claim 4, in which the added second redirection datum is a redirection from the first domain to the first domain.

6. The modification method as claimed in claim 4, in which the second redirection datum is a chain invalidity datum.

7. The modification method as claimed in claim 4, in which the added second redirection datum is a redirection from the first domain to a third domain.

8. The modification method as claimed in claim 4, in which the instruction message further comprises an identifier of the data server in the first domain.

9. The modification method as claimed in claim 4, in which the modified chain further comprises a signature datum relating to the first domain.

10. The modification method as claimed in claim 4, in which the modified chain further comprises a chain validity time.

11. The modification method as claimed in claim 4, in which the at least one modification step further comprises validating the received chain and signing the added second redirection datum.

12. A redirection device, relating to identification of a data server capable of delivering a content to a terminal, in a resolution server of a communication architecture, comprising:
   a processor; and
   a non-transitory computer-readable medium comprising instructions stored thereon which when executed by the processor configure the redirection device to:
   transfer, to a second name server of a second domain, a domain name system (DNS) request message for obtaining an identifier of the data server in the second domain, received from the terminal,
   receive, from the second name server, a message for redirection to a first domain, said redirection message including a delegation chain comprising a first datum for redirection from the second domain to the first domain,
   receive, from a first name server, at least one instruction message comprising the delegation chain modified with an addition of a second redirection datum,
   transmit, to the first name server, at least one DNS request message for obtaining an identifier of the data server in the first domain, the transmitted at least one DNS request message comprising the received delegation chain, and transmit, to the second name server, a control message comprising the delegation chain modified with the second redirection datum added by the first name server.

13. A device for modifying a delegation chain relating to provision of an identifier of a data server, capable of delivering a content to a terminal, implemented in a first name server of a first domain, and comprising:
- a processor; and
- a non-transitory computer-readable medium comprising instructions stored thereon which when executed by the processor configure the redirection device to:
- receive, from a resolution server, at least one domain name system (DNS) request message for obtaining an identifier of the data server in the first domain, the message comprising a delegation chain including a first datum for redirection from a second domain to the first domain,
- at least once modify the received delegation chain by an addition of a second redirection datum, and
- transmit, to the resolution server, at least one instruction message comprising the modified delegation chain.

14. A non-transitory storage medium storing instructions that can be read by a redirection device, which when executed by a processor of the redirection device, configure the redirection device to perform a method relating to identification of a data server capable of delivering a content to a terminal, in a resolution server of a communication architecture, the method comprising:
- transferring, to a second name server of a second domain, a domain name system (DNS) request message for obtaining an identifier of the data server in the second domain, received from the terminal,
- receiving, from the second name server, a message for redirection to a first domain, said redirection message including a delegation chain comprising a first datum for redirection from the second domain to the first domain,
- receiving, from a first name server, at least one instruction message comprising the delegation chain modified with an addition of a second redirection datum,
- transmitting, to the first name server, at least one DNS request message for obtaining an identifier of the data server in the first domain, the transmitted at least one DNS request message comprising the received delegation chain, and
- transmit, to the second name server, a control message comprising the delegation chain modified with the second redirection datum added by the first name server.

* * * * *